United States Patent [19]

Uemura et al.

[11] Patent Number: 5,186,873
[45] Date of Patent: Feb. 16, 1993

[54] PROCESS FOR PREPARING CARBON/CARBON COMPOSITE

[75] Inventors: Seiichi Uemura, Ota; Yoshio Souda, Machida; Osamu Kato, Yokohama; Takefumi Kouno, Kawasaki; Tsutomu Kihara, Yokohama, all of Japan

[73] Assignee: Nippon Oil Company, Limited, Tokyo, Japan

[21] Appl. No.: 698,658

[22] Filed: May 10, 1991

[30] Foreign Application Priority Data

May 11, 1990 [JP] Japan .................. 2-119916

[51] Int. Cl.$^5$ ............................. C01B 31/02
[52] U.S. Cl. .................. 264/29.5; 264/29.6; 264/29.7; 423/447.4; 423/447.7; 423/447.8; 427/227; 427/228

[58] Field of Search ............. 264/29.1, 29.5, 29.6, 264/29.7, 136, 137, 257, 258; 156/89, 155, 242, 245; 427/226, 227, 228, 384; 423/445, 447.1, 447.4, 447.7, 447.8, 448, 449

[56] References Cited

U.S. PATENT DOCUMENTS 3,912,832 10/1975 Araki et al. .................. 427/226
5,057,254 10/1991 Sohda et al. ................ 264/29.5 X Primary Examiner—Leo B. Tentoni
Attorney, Agent, or Firm—Scully, Scott, Murphy & Presser

[57] ABSTRACT

A carbon/carbon composite is prepared by polymerizing a polycyclic aromatic compound in the presence of a coupling agent, then impregnating a bundle of carbon fibers with the resulting polymer, then carbonizing the thus-impregnated carbon fiber bundle under pressure or under pressing, and optionally, further carbonizing the thus-carbonized carbon fiber bundle at atmospheric pressure.

12 Claims, No Drawings

PROCESS FOR PREPARING CARBON/CARBON COMPOSITE

BACKGROUND OF THE INVENTION

The present invention relates to a process for preparing a carbon/carbon composite.

A carbon/carbon composite is a material having superior properties, for example, maintaining high strength and high elastic modulus and exhibiting only a small thermal expansion coefficient in an inert gas atmosphere even at high temperatures higher than 1,000° C. Its utilization as parts of aeronautic and space machinery and devices, brakes, furnace materials, etc. is expected.

However, in the case where a unidirectional laminate, a two-dimensional textile laminate, a mat-like laminate, or a felt-like laminate, is used as a reinforcing fiber for the carbon/carbon composite, if there is used a conventional pitch, furan resin, or a phenolic resin, as a carbonaceous matrix precursor, there will occur a ply separation under a strong bending stress, thus resulting in that the breaking strength of the composite is deteriorated.

In order to eliminate such drawback there has been made an attempt of using a three-dimensional fabric as a reinforcing fiber for the carbon/carbon composite. In this case, however, a complicated process involving a long manufacturing time is required.

It is the object of the present invention to overcome the above-mentioned problem and provide a simple process capable of preparing a carbon/carbon composite having high strength without causing ply separation.

SUMMARY OF THE INVENTION

The present invention resides in a process for preparing a carbon/carbon composite, which process comprises polymerizing a polycyclic aromatic compound in the presence of a coupling agent, then impregnating a bundle of carbon fibers with the resulting polymer, then carbonizing the thus-impregnated carbon fiber bundle under pressure or under pressing, and if necessary, further carbonizing the thus-carbonized carbon fiber bundle at atmospheric pressure.

DETAILED DESCRIPTION OF THE INVENTION

The present invention will be described in more detail hereinunder.

The "carbon/carbon composite" as referred to herein represents a material comprising a carbon fiber and a carbonaceous matrix.

As examples of the said carbon fiber there are mentioned various carbon fibers, including pitch-, polyacrylonitrile- or rayon-based carbon fibers. Particularly, pitch-based carbon fibers are preferred, and pitch-based carbon fibers prepared using an optically anisotropic pitch are most preferred.

For example, a pitch-based carbon fiber can be prepared in the following manner. Out of coal- or petroleum-based pitches ranging in softening point from 100° to 400° C., preferably 150° to 350° C., there is used an optically isotropic or anisotropic pitch, particularly preferably an optically anisotropic pitch having an optically anisotropic phase content of 60–100 vol %. First, the pitch is subjected to melt spinning into a pitch fiber according to a conventional process, then the pitch fiber is rendered infusible at a temperature usually in the range of 50° to 400° C., preferably 100° to 350° C., followed by a carbonization treatment usually at 800°–3,000° C. in an inert gas atmosphere. As the oxidizing gas there may be used, for example, air oxygen, nitrogen oxide, sulfur oxide, or halogen, each alone or in a suitable combination.

In the present invention, the carbon fiber is used usually as a bundle of 500 to 25,000 fibers, which fiber bundle is in the form of a unidirectional laminate, a two- or three-dimensional fabric, a mat-like shaped article, a felt-like shaped article, or a laminate using any of such shaped articles and laminates.

As the carbonaceous matrix precursor used in the present invention there is used a polymer prepared by polymerizing a polycyclic aromatic compound in the presence of a binder.

Preferred examples of such polycyclic aromatic compound include condensed polycyclic aromatic hydrocarbonds such as naphthalene, anthracene, phenanthrene, and pyrene. Also employable are condensed polycyclic aromatic compounds substituted with alkyl groups having 1 or more, preferably 1 to 3, carbon atoms, such as monoalkylnaphthalenes and monoalkylathracenes.

For obtaining the carbonaceous matrix precursor used in the invention, the polycyclic aromatic compound exemplified above is polymerized using a Lewis acid catalyst or a protic acid catalyst in the presence of a coupling agent.

As examples of the coupling agent there are mentioned haloalkanes having 1 or 2 carbon atoms and 2 or more halogen atoms as substituent groups bonded thereto, as well as aromatic compounds containing hydroxyl group and/or carbonyl group. More concrete examples are methylene chloride, chloroform tetrachloroethane, catechol, benzaldehyde, 1,4-benzenecarbaaldehyde, p-xylene glycol, and 2,5-dimethyl-p-xylene glycol.

The mixing ratio of the polycyclic aromatic compound and the coupling agent is not specially limited and an optimal ratio can be selected optionally, provided it is desirable that the proportion of the polycyclic aromatic compound be usually in the range of 90 to 10 mol %, preferably 80 to 20 mol %, and that of the binder be usually in the range of 10 to 90 mol %, preferably 20 to 80 mol %.

The catalyst to be used in the above polymerization is suitably selected according to the coupling agent used. For example, in the case where a haloalkane exemplified above is used as the coupling agent, there preferably is used a Lewis acid catalyst such as aluminim chloride, tin chloride, or titanium tetrachloride, while in the case of using a hydyroxyl group-containing organic compound as the coupling agent, there preferably is used a protic acid catalyst having affinity for organic compounds, such as sulfuric acid, hydrochloric acid, phosphoric acid, or an organosulfonic acid.

This polymerization is conducted at a temperature usually in the range from the melting point to the boiling point of the polycyclic aromatic compound used, preferably 70° to 250° C., for usually 1 to 15 hours, preferably 3 to 10 hours.

The resulting polymer may be used directly in the process of the present invention, but it is desirable that the catalyst used in the polymerization be removed by water-washing and filtration.

Then, it is preferred that unreacted components and light fractions be removed by distillation where required. The polymer thus obtained is used as the carbonaceous matrix precursor in the process of the present invention. Particularly preferably, the polymer has an average molecular weight in the range of 250 to 2,500.

As the polymer thus prepared and used in the process of the invention, an optically anisotropic one or an optically isotropic one can be used each alone or as a mixture. Preferably, the polymer used as the carbonaceous matrix precursor has an optically anisotropic phase content of at least 5 vol %, most preferably 15-100 vol %.

The following description is now provided about how to prepare the carbon/carbon composite of the invention using a bundle of carbon fibers and the carbonaceous matrix precursor.

First, a bundle of carbon fibers is impregnated with the carbonaceous matrix precursor. This impregnation is performed by melting said precursor under reduced pressure. Suitable conditions for the impregnation can be selected according to properties of the carbonaceous matrix used. But it is desirable that the impregnation under reduced pressure be followed by the application of pressure in an atmosphere of an inert gas, e.g. $N_2$.

With a view to reducing the viscosity in the impregnation there may be used a solvent for dilution such as, for example, an aromatic hydrocarbon, pyridine, or quinoline.

Then, the thus-impregnated carbon fiber bundle is carbonized under pressure or under pressing, and if necessary, further carbonized at atmospheric pressure, whereby there is obtained the carbon/carbon composite of the invention.

The carbonization under pressure can be carried out by heating to 400°-2,000° C. under isotropic pressurization at 50-10,000 kg/cm$^2$ using an inert gas.

Preferably, the carbonization under pressing is performed by heating to 400°-2,000° C. under uniaxial pressing at 10-500 kg/cm$^2$ using a hot press.

There also may be used an HIP (hot isostatic pressing) apparatus for the carbonization. Pressure and heating conditions in the HIP apparatus involve pressurizing to 50-10,000 kg/cm$^2$, preferably 200-2,000 kg/cm$^2$, using an inert gas, and heating to 100°-3,000° C. preferably 400°-2,000° C. As a pressure medium gas there may be used an inert gas such as argon, nitrogen, or helium.

The carbonization at atmospheric pressure, which is conducted as necessary after the carbonization under pressure or under pressing, can be carried out at 400°-3,000° C. in an inert gas atmosphere.

The volume content of the carbon fibers in the carbon/carbon composite prepared in the above manner can be determined optionally according to purposes, but usually it is in the range of 5% to 70%.

The carbon/carbon composite prepared according to the process of the present invention has a high strength without destruction caused by ply separation.

The following examples are given to further illustrate the present invention, but the invention is not limited thereto.

EXAMPLE 1

300 g of naphthalene, 100 g of chloroform, 1,000 g of dichlorobenzene as solvent and 30 g of aluminum chloride as catalyst were placed in a three-necked flask equipped with a stirrer, and polymerization was allowed to take place at 60° C. for 3 hours, then at 80° C. for 1 hour.

Thereafter, the catalyst was removed by washing with water and filtration, followed by heating at 250° C., 1 Torr, and 380° C., 5 Torr, each for 3 hours to remove the solvent, unreacted components and light fractions.

A carbonaceous matrix precursor thus obtained had a softening point of 240° C. and an optically anisotropic phase content of 60 vol %. Then, a laminate of a two-dimensional fabric (plain weave) formed using a bundle of pitch-based carbon fibers having an elastic modulus of $40 \times 10^3$ kgf/mm$^2$ and a diameter of 10 µm was laminated with the carbonaceous matrix precursor at 320° C. The impregnation was carried out by heating the mixture to 320° C. at a reduced pressure of 5 mmHg, holding it in this state for 2 hours, then pressurizing to 5.5 kg/cm$^2$ using $N_2$ gas, holding the mixture in this state for 1 hour, followed by slow cooling and release to atmospheric pressure.

The thus-impregnated laminate was hot-pressed at 600° C. under a pressure of 130 kg/cm$^2$ and then carbonized at 1,000° C., atmospheric pressure, for 1 hour to obtain a carbon/carbon composite.

The carbon/carbon composite thus obtained was subjected to three-point bending test according to ASTM D790. As a result, it was found to have a bending strength of 31 kgf/mm$^2$, and destruction occurred from the tensile stress side, with no ply separation observed.

EXAMPLE 2

300 g of naphthalene, 15 g of tert-butyl catechol, 1,000 g of dichlorobenzene as solvent and 30 g of aluminum bromide as catalyst were placed in a three-necked flask equipped with a stirrer, and polymerization was allowed to take place at 180° C. for 3 hours. Thereafter, the catalyst was removed by washing with water and filtration, followed by heating at 250° C., 1 Torr, and 400° C. 10 Torr, each for 2.5 hours to remove the solvent, unreacted components and light fractions. A carbonaceous matrix precursor thus obtained had a softening point of 275° C. and an optically anisotropic phase content of 55 vol %.

Then, the same carbon fiber bundle as that used in Example 1 was impregnated with the carbonaceous matrix precursor in the same way as in Example 1, followed by hot pressing and carbonization in the same manner as in Example 1 to obtain a carbon/carbon composite.

The carbon/carbon composite thus obtained was subjected to a bending test in the same manner as in Example 1. As a result, it was found to have a bending strength of 38 kgf/mm$^2$, and destruction occurred from the tensile stress side, with no ply separation observed.

COMPARATIVE EXAMPLE 1

300 g of naphthalene, 1,000 g of dichlorobenzene as solvent and 30 g of aluminum chloride as catalyst were placed in a three-necked flask equipped with a stirrer. Polymerization was allowed to take place at 25° C. for 3 hours, then at 180° C. for 8 hours.

Thereafter, the catalyst was removed by washing with water and filtration, followed by heating at 250° C., 1 Torr, and 380° C., 5 Torr, each for 3 hours to remove the solvent, unreacted components and light a fractions.

There was obtained a carbonaceous pitch precursor having a softening point of 250° C. and an optical anisotropy. Then, the same carbon fiber bundle as that used in Example 1 was impregnated with the carbonaceous matrix precursor in the same way as in Example 1.

The thus-impregnated carbon fiber bundle was then subjected to hot pressing and carbonization in the same manner as in Example 1 to obtain a carbon/carbon composite.

The carbon/carbon composite thus obtained was subjected to a bending test in the same manner as in Example 1. As a result, it exhibited a bending strenght of 20 kgf/mm$^2$, an destruction was caused by ply separation.

COMPARATIVE EXAMPLE 2

An optically anisotropic pitch having a softening point of 260° C. and an optically anisotropic phase content of substantially 100% was used as a carbonaceous matrix precursor. The same carbon fiber bundle as that used in Example 1 was impregnated with the said optically anisotropic pitch in the same way as in Example 1.

The thus-impregnated carbon fiber bundle was then subjected to hot pressing and carbonization in the same manner as in Example 1 to obtain a carbon/carbon composite.

The carbon/carbon composite thus obtained was subjected to a bending test in the same way as in Example 1. As a result, it exhibited a bending strength of 24 kgf/mm$^2$, and destruction was caused by ply separation.

What is claimed is:

1. A process for preparing a carbon/carbon composite, which process comprises polymerizing a polycyclic aromatic compound in the presence of a coupling agent, then impregnating a bundle of carbon fibers with the resulting polymer, then carbonizing the thus-impregnated carbon fiber bundle under pressure or under pressing, and optionally, further carbonizing the thus-carbonized carbon fiber bundle at atmospheric pressure.

2. A process as set for the in claim 1, wherein said polycyclic aromatic compound is naphthalene, anthracene, phenanthrene, pyrene or alkyl-substitued derivatives thereof.

3. A process as set forth in claim 1, wherein said coupling agent is a haloalkane having 1 or 2 carbon atoms and at least two halogen atoms, or an aromatic compound having at least one of hydroxy and carboxylic acid groups.

4. A process as set forth in claim 1, wherein said polymerization is conducted using a Lewis acid or protic acid catalyst.

5. A process as set forth in claim 1, wherein said polymer has an average molecular weight in the range of 250 to 2,500.

6. A process as set forth in claim 1, wherein said polymer has an optical anisotropic phase content of at least 5 vol %.

7. A process as set forth in claim 1, wherein said carbon fiber bundle is used in the form of a unidirectional laminate, a two- or three-dimensional fabric, a mat- or felt-like shaped article or a laminate formed from a unidirectional laminate, a two- or three-dimensional fabric, or a mat- or felt-like shaped article.

8. A process as set forth in claim 1, wherein the carbonization under pressure is carried out by heating to a temperature of 400° to 2,000° C. under isotropic pressurization at 50–10,000 kg/cm$^2$ using an inert gas.

9. A process as set forth in claim 1, wherein the carbonization under pressing is carried out by heating to a temperature of 400° to 2,000° C. under uniaxial pressing at 10–500 kg/cm$^2$.

10. A process as set forth in claim 1, wherein the carbonization under pressure is carried out by heating to a temperature of 100°–3,000° C. and pressurizing to 50–10,000 kg/cm$^2$ using an inert gas by means of a hot isostatic pressing apparatus.

11. A process as set forth in claim 1, wherein the volume content of the carbon fibers in the carbon/carbon composite is about 5 to 70%.

12. A process as set forth in claim 1, wherein the carbonization which is performed at atmospheric pressure optionally after the carbonization under pressure or under pressing is carried out at a temperature of 400° to 3,000° C. in an inert gas atmosphere.

* * * * *